Figure 1:
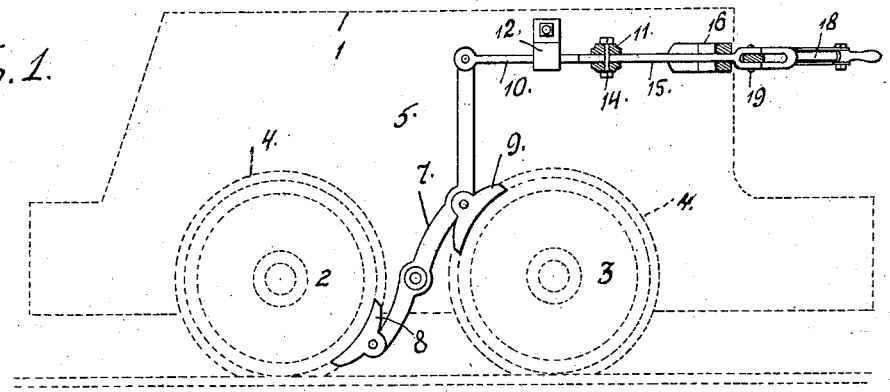

No. 869,077. PATENTED OCT. 22, 1907.
J. F. FLYNN.
BRAKE FOR MINE LOCOMOTIVES.
APPLICATION FILED MAY 7, 1907.

WITNESSES:
A. H. Rabsag,

INVENTOR
J. F. Flynn
BY
Attorneys

UNITED STATES PATENT OFFICE.

JAMES F. FLYNN, OF PARDUS, PENNSYLVANIA.

BRAKE FOR MINE-LOCOMOTIVES.

No. 869,077.   Specification of Letters Patent.   Patented Oct. 22, 1907.

Application filed May 7, 1907. Serial No. 372,425.

*To all whom it may concern:*

Be it known that I, JAMES F. FLYNN, a citizen of the United States of America, residing at Pardus, in the county of Jefferson and State of Pennsylvania, have invented certain new and useful Improvements in Brakes for Mine-Locomotives, of which the following is a specification, reference being had therein to the accompanying drawing.

This invention relates to brakes for mine locomotives, and the invention has for its object to provide a novel brake that can be easily and quickly applied, the brake being designed for various types of electric locomotives used in mines.

Another object of this invention is to provide a simple and inexpensive brake that will not interfere with the general operating mechanism of a mine locomotive.

A further object of this invention is to provide a strong and durable brake that can readily be used in connection with short coupled locomotives, the brake occupying a comparatively small space within the locomotive.

With the above and other objects in view, the invention consists in the novel construction, combination and arrangement of parts to be hereinafter more fully described and then specifically pointed out in the appended claims.

Figure 2:
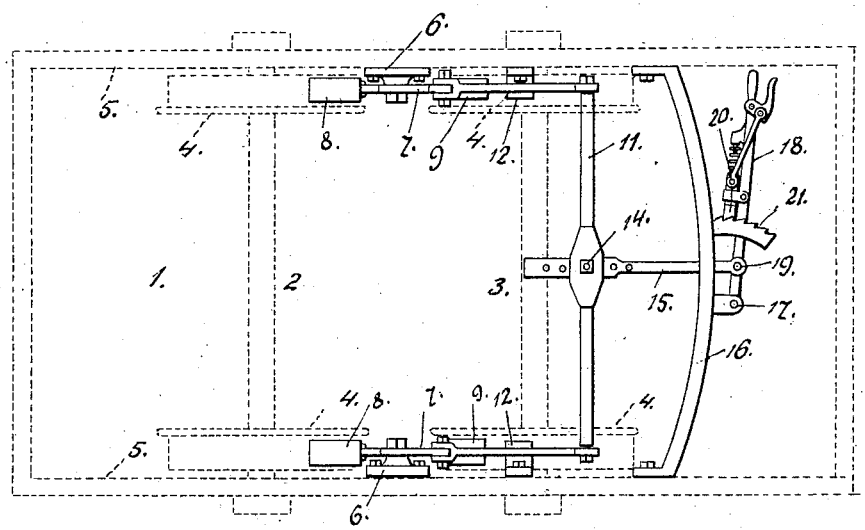

Referring to the drawing forming part of this specification, like numerals of reference designate corresponding parts throughout the several views, in which:

Figure 1 is a longitudinal sectional view of my improved brake mechanism as applied to a locomotive, Fig. 2 is a plan of the same.

In the accompanying drawing, I have illustrated in dotted lines a portion of a conventional form of mine locomotive, the locomotive comprising a casing or housing 1 for trucks 2 and 3, said trucks having flanged wheels 4.

My invention resides in providing the side walls 5 of the casing or housing with bearings 6 for pivoted brake levers 7 said levers being provided with brake shoes 8 and 9, the shoes 8 engaging the wheels 4 of the truck 2 and the shoes 9 engaging the wheels 4 of the truck 3. The upper ends of the brake levers 7 are connected by links 10 to the ends of a cross head 11, said links being guided in brackets 12 carried by the side walls 5 of the casing or housing 1.

The cross head 11 is adjustably connected as at 14, to a rod 15, slidably mounted in a horizontally disposed bracket 16, carried by the side walls 5 of the locomotive. Pivotally connected to the bracket 16 as at 17, is an actuating lever 18, said lever being connected to the rod 15, as at 19, and provided with a spring pressed locking pawl 20 adapted to engage in a toothed segment-shaped rack 21 carried by the bracket 16. The spring pressed locking pawl 20 is of a conventional form ordinarily used in connection with the throttle or similar lever.

I desire to call particular attention to the construction of the brake levers 7 and the arrangement of the brake shoes 8 and 9. By referring to Fig. 1 of the drawing, it will be observed that the brake shoes 8 engage the under side of the wheels 4 of the truck 2, while the shoes 9 engage the upper side of the wheels 4 of the truck 3, consequently when the actuating lever 18 is moved to set the brakes, the stress and strain upon the shoes 8 and 9, will be equalized and practically no strain will be exerted upon the bearings 6 of the brake levers 7. In so arranging the brake shoes, I obtain more positive results than could be otherwise accomplished by arranging the shoes to engage only the upper or under side of the wheels 4.

The simplicity of construction entering into my improved brake permits of an ordinary locomotive being readily equipped with the same, and the novel manner in which the brake shoes are disposed allows the brake to be used in connection with a very short coupled locomotive, this type of locomotive being more desirable in a mine than that of a long coupled locomotive. The brake shoes can be easily and quickly renewed at any desired time without interfering with or removing any part of the operating mechanism of the locomotive and while I have herein illustrated the actuating lever 18 as being disposed in a horizontal plane, it is obvious that the same can be changed to conform to the various types of locomotives at present used.

Such changes in the arrangement and minor details of my invention as are permissible by the appended claims, may be resorted to without departing from the spirit and scope of the invention.

What I claim and desire to secure by Letters Patent, is:—

The combination with the trucks and housing of a mine locomotive, of pivoted brake levers carried by the side walls of said housing, shoes connected to said brake levers and adapted to engage the under side of the wheels of one truck and the upper side of the wheels of another truck, a cross head connecting with said brake levers, a bracket carried by the side walls of said housing, a rod movably mounted in said bracket and adjustably connecting with said cross head, an actuating lever pivotally connected to said bracket and to said rod, and means to lock said actuating lever in a fixed position either to set or release said brake shoes, substantially as described.

In testimony whereof I affix my signature in the presence of two witnesses.

JAMES F. FLYNN.

Witnesses:
ROBT. HODGSON,
JOSEPH TAYLOR.